(12) United States Patent
Chin et al.

(10) Patent No.: US 12,197,067 B1
(45) Date of Patent: Jan. 14, 2025

(54) LIQUID CRYSTAL DISPLAY WITH IMPROVED STRUCTURE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Hung-Chieh Chin, Miaoli County (TW); Hsuan-Man Chang, Miaoli County (TW); Ching-Lin Li, Miaoli County (TW)

(73) Assignees: Interface Technology (ChengDu) Co., Ltd., Chengdu (CN); Interface Optoelectronics (ShenZhen) Co., Ltd., Shenzhen (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/239,263

(22) Filed: Aug. 29, 2023

(30) Foreign Application Priority Data

Jul. 26, 2023 (CN) .......................... 202310930341.8

(51) Int. Cl.
*G02F 1/1335* (2006.01)
*B32B 7/12* (2006.01)
*G02F 1/1333* (2006.01)

(52) U.S. Cl.
CPC .......... *G02F 1/133528* (2013.01); *B32B 7/12* (2013.01); *G02F 1/133331* (2021.01); *B32B 2307/42* (2013.01)

(58) Field of Classification Search
None
See application file for complete search history.

(56) References Cited

U.S. PATENT DOCUMENTS

| 2019/0278132 | A1* | 9/2019 | Nakamura | ........... G02B 5/3025 |
| 2022/0113584 | A1* | 4/2022 | Zeng | ................. G02F 1/133512 |
| 2024/0019750 | A1* | 1/2024 | Ge | ......................... G02F 1/1362 |

FOREIGN PATENT DOCUMENTS

| CN | 217821180 U | * | 11/2022 | |
| CN | 117075375 A | * | 11/2023 | |
| WO | WO-2021084874 A1 | * | 5/2021 | ....... B32B 17/10018 |

* cited by examiner

*Primary Examiner* — Phu Vu
(74) *Attorney, Agent, or Firm* — Locke Lord LLP; Tim Tingkang Xia, Esq.

(57) ABSTRACT

The present invention provides a liquid crystal display with improved structure. A liquid crystal display includes a cover plate, a polarizing layer, and a liquid crystal display unit layer. The cover plate is placed on the polarizing layer, and the polarizing layer is placed on the liquid crystal display unit layer. Between the cover plate and the polarizing layer or between the polarizing layer and the liquid crystal display unit layer, an optical adhesive layer may further be included. The present invention further includes a filling layer, enabling the area between the cover plate and the polarizing layer, between the polarizing layer and the liquid crystal display unit layer, or between the polarizing layer and the optical adhesive layer to be completely filled. The present invention solves the problem of uneven appearance or structural defects in the liquid crystal display caused by difficulties in controlling the adhesive dispensing quantity.

19 Claims, 5 Drawing Sheets

LIQUID CRYSTAL DISPLAY WITH IMPROVED STRUCTURE

REFERENCE TO RELATED APPLICATIONS

The present application is based on, and claims priority from, China application number 202310930341.8 filed Jul. 26, 2023, the disclosure of which is hereby incorporated by reference herein in its entirety.

FIELD OF THE INVENTION

The present application relates to the field of displays, particularly to a liquid crystal display with improved structure.

BACKGROUND OF THE INVENTION

At present, mobile devices, such as the display panels like smartphones or tablet computers, have become products that are closely connected to people's lives. In response to market demands, mobile devices are evolving towards lightweight and narrow bezels. Consequently, conventional liquid crystal displays in mobile devices, optical components are primarily integrated into the liquid crystal display, and portions of the liquid crystal display corresponding to polarizing films and ink layers are removed to form optical holes. This prevents light from being blocked by polarizing films or ink layers, forming pathways for light to pass through. Optical components, such as cameras or infrared cameras. Therefore, external light can enter the optical component through optical holes.

However, due to polarizing films are generally bonded onto the liquid crystal display unit layer with optical adhesive and covered by a glass cover plate as a protective layer. The optical holes placed on the polarizing films need to be filled with optical adhesive through dispensing process. The optical holes on the polarizing films, having a diameter range of 2 to 3 millimeters and a depth of 70 to 100 micrometers. This results in difficulty in accurately controlling the amount of adhesive dispensed, leading to uneven appearance and even causing gaps between the areas to be filled with optical adhesive and the optical adhesive, resulting in structural defects.

SUMMARY OF THE INVENTION

One objective of the present invention is to resolve issues encountered in prior art, such as difficulties in controlling adhesive dispensing quantity, resulting in uneven appearance of liquid crystal display or causing gaps between the areas to be filled with optical adhesive and the optical adhesive.

According to a first aspect of the present invention, a liquid crystal display with improved structure is proposed. The liquid crystal display with improved structure includes a cover plate, a first optical adhesive layer, a first polarizing layer, a liquid crystal display unit layer, a second polarizing layer, and a first filling layer. The liquid crystal display unit layer is placed on the second polarizing layer. The first polarizing layer is placed on the liquid crystal display unit layer. The first optical adhesive layer is placed on the first polarizing layer. The cover plate is placed on the first optical adhesive layer. The first filling layer is placed between the first polarizing layer and the liquid crystal display unit layer.

In one embodiment of the present invention, the liquid crystal display with improved structure further includes at least one optical adhesive layer, the at least one optical adhesive is placed between cover plate and the first polarizing layer, between the first polarizing layer and the liquid crystal display unit layer, or between the first filling layer and the liquid crystal display unit layer.

According to a second aspect of the present invention, a liquid crystal display is also proposed. The liquid crystal display with improved structure includes a cover plate, a first optical adhesive layer, a first polarizing layer, a first filling layer, a liquid crystal display unit layer, and a second polarizing layer. The liquid crystal display unit layer is placed on the second polarizing layer. The first filling layer is placed on the liquid crystal display unit layer. The first polarizing layer is placed on the first filling layer. The first optical adhesive layer is placed on the first polarizing layer. The cover plate is placed on the first optical adhesive layer. The liquid crystal display unit layer includes a first light-shielding layer. A first optical hole is placed on the first light-shielding layer. A second optical hole is placed on the first polarizing layer, and is provided at a position corresponding to the first optical hole. The second optical hole is filled with a second filling layer. A material of both of the first filling layer and the second filling layer is a filling adhesive.

In one embodiment of the present invention, the first polarizing layer includes a first protective film layer, a polarizing film layer, and a second protective film layer. The polarizing film layer is placed on the second protective film layer. The first protective film layer is placed on the polarizing film layer. The second optical hole is a blind hole passing through the polarizing film layer and the second protective film layer, or a through hole passing through the first protective film layer, the polarizing film layer, and the second protective film layer.

In one embodiment of the present invention, a second optical adhesive layer is placed between the first filling layer and the liquid crystal display unit layer.

In one embodiment of the present invention, the first polarizing layer includes a first protective film layer, a polarizing film layer, and a second protective film layer. The polarizing film layer is placed on the second protective film layer. The first protective film layer is placed on the polarizing film layer. The second optical hole is a blind hole passing through the polarizing film layer and the second protective film layer, or a through hole passing through the first protective film layer, the polarizing film layer, and the second protective film layer.

In one embodiment of the present invention, a third optical hole is placed on the first optical adhesive layer, and is provided at a position corresponding to the first optical hole. The second optical hole and the third optical hole are filled with the second filling layer, and the second optical hole is a through hole passing through the first polarizing layer.

In one embodiment of the present invention, a second optical adhesive layer is placed between the first filling layer and the liquid crystal display unit layer.

In one embodiment of the present invention, the cover plate includes a second light-shielding layer. A fifth optical hole is placed on the second light-shielding layer, and is provided at a position corresponding to the first optical hole.

In one embodiment of the present invention, a dam is placed around a periphery of the first filling layer, and the dam is placed between the first polarizing layer and the liquid crystal display unit layer.

In one embodiment of the present invention, a dam is placed around a periphery of the first filling layer, and the dam is placed between the first polarizing layer and the second optical adhesive layer.

According to a third aspect of the present invention, a liquid crystal display is also proposed. The liquid crystal display with improved structure includes a cover plate, a first optical adhesive layer, a first filling layer, a first polarizing layer, a second optical adhesive layer, a liquid crystal display unit layer, and a second polarizing layer. The liquid crystal display unit layer is placed on the second polarizing layer. The second optical adhesive layer is placed on the liquid crystal display unit layer. The first polarizing layer is placed on the second optical adhesive layer. The first filling layer is placed on the first polarizing layer. The first optical adhesive layer is placed on the first filling layer. The cover plate is placed on the first optical adhesive layer. The liquid crystal display unit layer includes a first light-shielding layer. A first optical hole is placed on the first light-shielding layer. A second optical hole is placed on the first polarizing layer, and is provided at a position corresponding to the first optical hole. A fourth optical hole is placed on the second optical adhesive layer, and is provided at a position corresponding to the first optical hole. The second optical hole and the fourth optical hole are filled with a second filling layer. A material of both of the first filling layer and the second filling layer is a filling adhesive.

In one embodiment of the present invention, a dam is placed around a periphery of the first filling layer, and the dam is placed between the first optical adhesive layer and the first polarizing layer.

In one embodiment of the present invention, the cover plate includes a second light-shielding layer. A fifth optical hole is placed on the second light-shielding layer, and is provided at a position corresponding to the first optical hole.

To sum up, the present invention resolves the issues encountered in prior art, such as difficulties in controlling adhesive dispensing quantity, resulting in uneven appearance of liquid crystal display or causing gaps between the areas to be filled with optical adhesive and the optical adhesive.

DETAILED DESCRIPTION OF THE PREFERRED EMBODIMENTS

In order to make the person of ordinary skill in the art of the present invention understand the content of the present invention easily, embodiments of the present invention will now be described, by way of example only, with reference to the accompanying drawings.

In the description of the present invention, it should be understood that orientation or positional relationships indicated by terms "upper", "lower", "left", "right", etc. are based on orientation or positional relationship shown in the drawings, which are merely to facilitate the description of the present invention and simplify the description, not to indicate or imply that the device or elements must have a particular orientation, be constructed and operated in a particular orientation, and therefore cannot be construed as a limitation on the present invention. In addition, the terms "first", "second", "third", "fourth", and "fifth" are only used for descriptive purposes, and should not be construed as indicating or implying relative importance or implying the number of indicated technical features.

"One embodiment" described in the description means that a specific feature, structure, or characteristic is included in at least one of the embodiments. Thus, "one embodiment" set forth in the description does not necessarily refer to the same embodiment. In addition, a specific feature, structure, or characteristic may be implemented in any manner in one or more embodiments.

Figure 1:
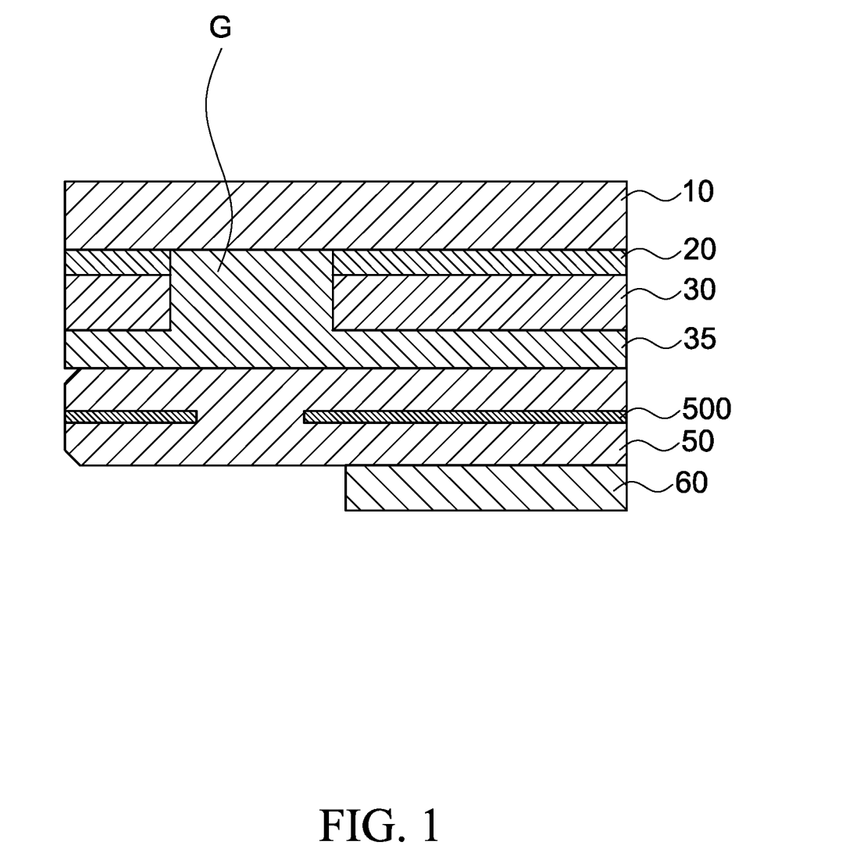
FIG. 1 is a schematic diagram of the stacking configuration of the liquid crystal display with improved structure in one embodiment of the present invention.

Please refer to FIG. 1, FIG. 1 is a schematic diagram of the stacking configuration of the liquid crystal display with improved structure in one embodiment of the present invention. In this embodiment, the liquid crystal display with improved structure includes a cover plate 10, a first optical adhesive layer 20, a first polarizing layer 30, a first filling layer 35, a liquid crystal display unit layer 50, and a second polarizing layer 60. The liquid crystal display unit layer 50 is placed on the second polarizing layer 60. The first filling layer 35 is placed on the liquid crystal display unit layer 50. The first polarizing layer 30 is placed on the first filling layer 35. The first optical adhesive layer 20 is placed on the first polarizing layer 30. The cover plate 10 is placed on the first optical adhesive layer 20. The liquid crystal display unit layer 50 includes a first light-shielding layer 500. A first optical hole is placed on the first light-shielding layer 500. A second optical hole is placed on the first polarizing layer 30, and is provided at a position corresponding to the first optical hole. A third optical hole is placed on the first optical adhesive layer 20, and is provided at a position corresponding to the first optical hole. The second optical hole and the third optical hole are filled with a second filling layer G. A material of both of the first filling layer 35 and the second filling layer G is a filling adhesive. The first optical hole is a through hole passing through the first light-shielding layer 500. The second optical hole is a through hole passing through the first polarizing layer 30. The third optical hole is a through hole passing through the first optical adhesive layer 20. In addition, the liquid crystal display with improved structure includes a display area and a non-display area, the first polarizing layer 30 is provided at a position corresponding to the display area. The first optical hole, the second optical hole, and the third optical hole are all provided at a position corresponding to the non-display area.

Please refer to FIG. 1. In this embodiment, the present invention involves the addition of the first filling layer 35 between the first polarizing layer 30 and the liquid crystal display unit layer 50, and the second optical hole of the first polarizing layer 30 is filled with the second filling layer G. In the process of producing the liquid crystal display with improved structure of the present invention, the aforementioned structure involves creating a hole at a position corresponding to the first optical hole on the first polarizing layer to form the second optical hole, subsequently, a filling adhesive is used to fill a gap between the first polarizing layer 30 and the liquid crystal display unit layer 50, and also to fill the second optical hole, thereby forming the first filling layer 35 and the second filling layer G. In this embodiment, the first filling layer 35 and the second filling layer G in the second optical hole are integrally formed, while the process of filling the filling adhesive can be performed in a single filling or divided into multiple fillings. The present invention is not specifically limited thereto.

Figure 2:
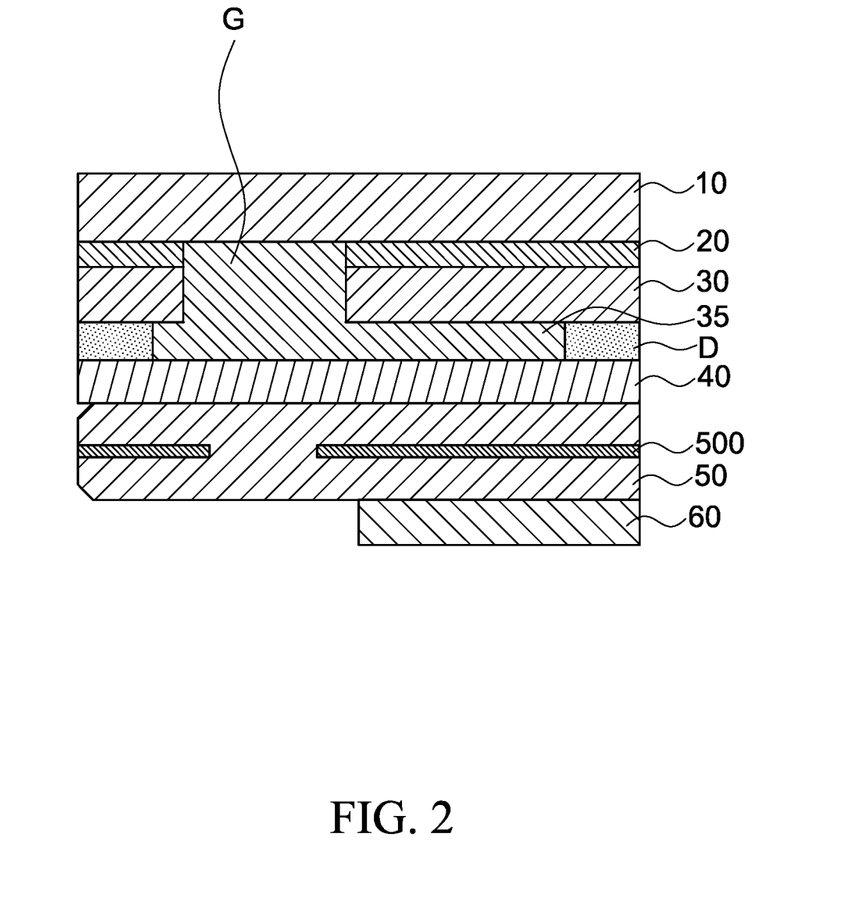
FIG. 2 is a schematic diagram of the stacking configuration of the liquid crystal display with improved structure in another embodiment of the present invention.

Please refer to FIG. 2, FIG. 2 is a schematic diagram of the stacking configuration of the liquid crystal display with improved structure in another embodiment of the present invention. The difference between FIG. 2 and FIG. 1 is the inclusion of a second optical adhesive layer 40 between the first filling layer 35 and the liquid crystal display unit layer 50, additionally, a periphery of the first filling layer 35 includes a dam D, with the dam D placed between the first polarizing layer 30 and the second optical adhesive layer 40. In this embodiment, a process begins with the application of an optical adhesive onto liquid crystal display unit layer 50. A dam adhesive is applied around a periphery of the lower surface of the first polarizing layer 30, subsequently, the first polarizing layer 30 is placed on the upper surface of the second optical adhesive layer 40, allowing the dam adhesive to contact the upper surface of the second optical adhesive layer 40. Following this, the dam adhesive is cured to form the dam D, forming a frame. This enables subsequent potting process through the second optical hole of the first polarizing layer 30, leading to the formation of the first filling layer 35, and the formation of the second filling layer G in the second optical hole. Therefore, the present invention allows users to have a great variety of options in the process of forming the first filling layer 35 and the second filling layer G by setting the dam D.

Figure 3:
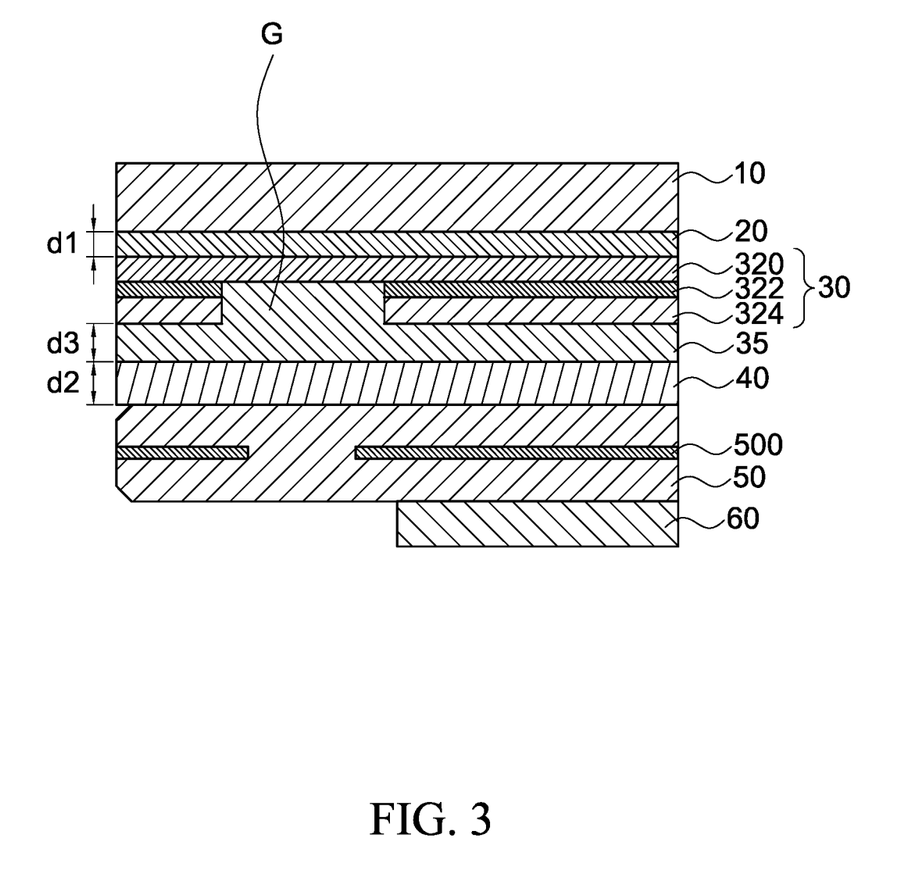
FIG. 3 is a schematic diagram of the stacking configuration of the liquid crystal display with improved structure in further embodiment of the present invention.

Please refer to FIG. 3, FIG. 3 is a schematic diagram of the stacking configuration of the liquid crystal display with improved structure in further embodiment of the present invention. The difference between FIG. 3 and FIG. 1 is the inclusion of a second optical adhesive layer 40 between the first filling layer 35 and the liquid crystal display unit layer 50, and the second optical hole is a blind hole. In this embodiment, the first polarizing layer 30 includes a first protective film layer 320, a polarizing film layer 322, and a second protective film layer 324. The polarizing film layer 322 is placed on the second protective film layer 324. The first protective film layer 320 is placed on the polarizing film layer 322. The second optical hole is a blind hole passing through the polarizing film layer 322 and the second protective film layer 324. Due to the second optical hole is a blind hole, the integrity of the first protective layer 320 remains intact, enabling it to continue providing protection to the underlying structure.

Figure 4:
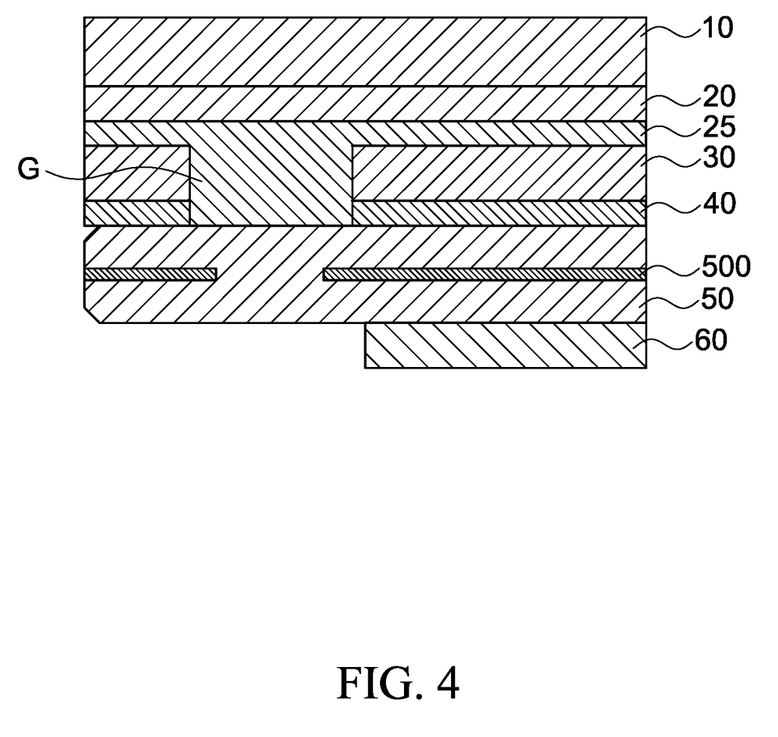
FIG. 4 is a schematic diagram of the stacking configuration of the liquid crystal display with improved structure in yet another embodiment of the present invention.

Please refer to FIG. 4, FIG. 4 is a schematic diagram of the stacking configuration of the liquid crystal display with improved structure in yet another embodiment of the present invention. In this embodiment, a liquid crystal display with improved structure includes a cover plate 10, a first optical adhesive layer 20, a first filling layer 25, a first polarizing layer 30, a second optical adhesive layer 40, a liquid crystal display unit layer 50, and a second polarizing layer 60. The liquid crystal display unit layer 50 is placed on the second polarizing layer 60. The second optical adhesive layer 40 is placed on the liquid crystal display unit layer 50. The first polarizing layer 30 is placed on the second optical adhesive layer 40, the first filling layer 25 is placed on the first polarizing layer 30. The first optical adhesive layer 20 is placed on the first filling layer 25. The cover plate 10 is placed on the first optical adhesive layer 20. The liquid crystal display unit layer 50 includes a first light-shielding layer 500. A first optical hole is placed on the first light-shielding layer 500. A second optical hole is placed on the first polarizing layer 30, and is provided at a position corresponding to the first optical hole. A fourth optical hole is placed on the second optical adhesive layer 40, and is provided at a position corresponding to the first optical hole. The second optical hole and the fourth optical hole are filled with a second filling layer G. A material of both of the first filling layer and the second filling layer is a filling adhesive. The difference between FIG. 4 and FIG. 1 is characterized by the placement of the first filling layer 25, placed between the first optical adhesive layer 20 and the first polarizing layer 30, in contrast, the first filling layer 35 in FIG. 1 is placed between the first polarizing layer 30 and the liquid crystal display unit layer 50. Furthermore, FIG. 4 includes a second optical adhesive layer 40, and the second optical adhesive layer 40 is placed between the first polarizing layer 30 and the liquid crystal display unit layer 50.

Figure 5:
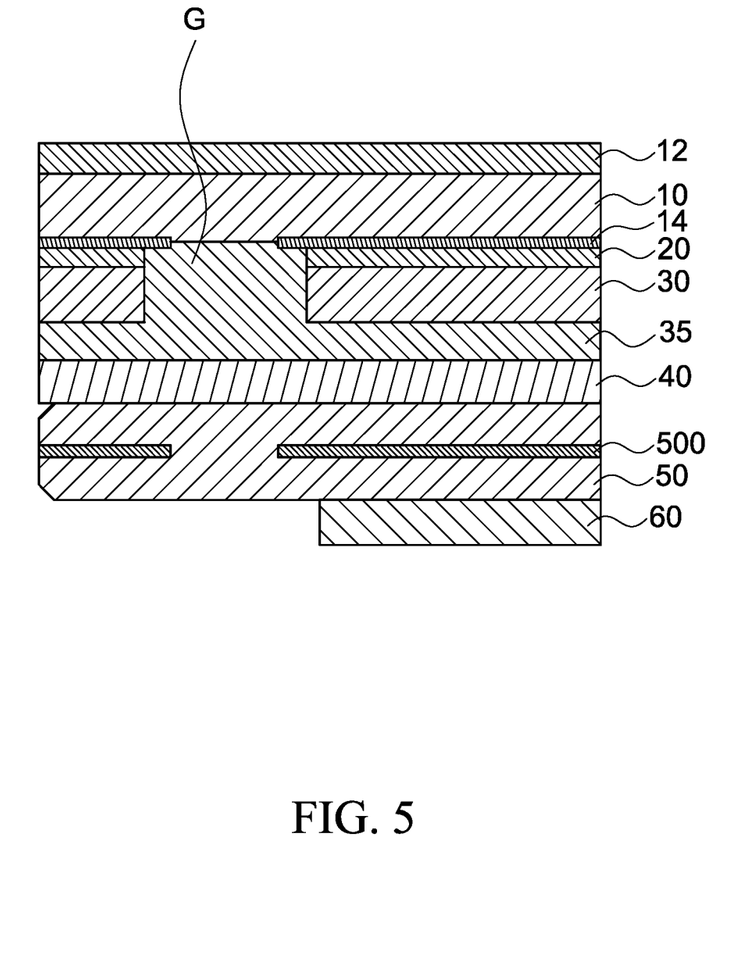
FIG. 5 is a schematic diagram of the stacking configuration of the liquid crystal display with improved structure in further another embodiment of the present invention.

Please refer to FIG. 5, FIG. 5 is a schematic diagram of the stacking configuration of the liquid crystal display with improved structure in further another embodiment of the present invention. The difference between FIG. 5 and FIG. 1 is the inclusion of a second optical adhesive layer 40 between the first filling layer 35 and the liquid crystal display unit layer 50, additionally, the cover plate 10 includes a surface treatment area 12 and a second light-shielding layer 14. A fifth optical hole is placed on the second light-shielding layer 14, and is provided at a position corresponding to the first optical hole. The surface treatment area 12 represents an area on the outer side of the cover plate 10 that has undergone surface treatment. The surface treatment can be any one or a combination of surface hardening treatment, anti-glare treatment, or anti-reflective treatment. In preferred embodiments of the present invention, when undergoing surface hardening treatment, a pencil hardness of the surface treatment area 12 of the cover plate 10 ranges from 3H to 9H. When undergoing anti-glare treatment, a reflectance of the surface treatment area 12 of the cover plate 10 is less than 2%. When undergoing anti-reflective treatment, a haze of the surface treatment area 12 of the cover plate 10 ranges from 5% to 30%.

Please refer to FIG. 1 to FIG. 5, in the aforementioned embodiments, a material of the cover plate 10 can be a transparent material such as plastic or glass. In a preferred embodiment of the present invention, a thickness of the cover plate 10 is less than 250 micrometers.

Please refer to FIG. 1 to FIG. 5, in the aforementioned embodiments, both of the first polarizing layer 30 and the second polarizing layer 60 are polarizers. In the embodiment shown in FIG. 4 illustrates that the first polarizing layer 30 includes a first protective film layer 320, a polarizing film layer 322, and a second protective film layer 324. Both of the first protective film layer 320 and the second protective film layer 324 are triacetate cellulose film (TAC film). The polarizing film layer 322 is polyvinyl alcohol (PVA film).

Please refer to FIG. 1 to FIG. 5, in the aforementioned embodiments, the first optical adhesive can be optically clear adhesive or a liquid optically clear adhesive. The first optical adhesive layer 20 has first thickness d1, and the first thickness ranges from 20 micrometers to 125 micrometers. The second optical adhesive layer 40 can be optically clear adhesive or a liquid optically clear adhesive. The second optical adhesive layer 20 has second thickness d2, and the second thickness d2 ranges from 20 micrometers to 125 micrometers. The first filling layer 35 has third thickness d3, and the third thickness d3 ranges from 1 micrometers to 35 micrometers. The first thickness d1, the second thickness d2, and the third thickness d3 are collectively shown in FIG. 3, additionally, thickness of the first filling layer 25 in FIG. 4 is the same as the third thickness d3 shown in FIG. 3.

Please refer to FIG. 1 to FIG. 5, in the aforementioned embodiments, the dam adhesive can be light curing adhesive or thermal curing adhesive. Thickness of the dam is the same as the third thickness d3 of the first filling layer 35.

Please refer to FIG. 1 to FIG. 5, in the aforementioned embodiments, the liquid crystal display unit layer 50 is used for image display. The liquid crystal display unit layer 50 includes a color filter glass substrate, the first light-shielding layer 500, a liquid crystal layer, and a thin film transistor substrate. The first light-shielding layer 500 corresponds to an optical component. The liquid crystal layer is placed on the thin film transistor substrate. The first light-shielding layer 500 is placed on the liquid crystal layer. The color filter substrate is placed on the first light-shielding layer 500. This is an example of the structure of the general liquid crystal display unit layer 50, but the present invention is not limited thereto.

Please refer to FIG. 1 to FIG. 5, in the aforementioned embodiments, both of the first light-shielding layer 500 and the second light-shielding layer 14 are ink layers.

Please refer to FIG. 1 to FIG. 5, in the aforementioned embodiments, the settings of the first optical hole, the second optical hole, the third optical hole, the fourth optical hole, and the fifth optical hole are all used to allow light from the external environment to enter the liquid crystal display with improved structure, or to allow a light emitted by the optical component of the liquid crystal display with improved structure to enter the external environment. In addition, the filling adhesive can be a light curing adhesive or a thermal curing adhesive, such as acrylic adhesive or epoxy resin. A light transmission of the filling adhesive is over 90%, and a haze of the filling adhesive is less than 1%. The first optical hole is provided at a position corresponding to the optical component (not shown in the figures) of the liquid crystal display with improved structure of the present invention. Depending on the type of the optical component, such as camera, infrared camera or LED light, the first optical hole can be a camera hole, an infrared hole (IR hole), or a light-emitting diode hole (LED hole), but the present invention is not limited thereto. Therefore, the optical component (not shown in the figures) of the liquid crystal display with improved structure of the present invention can either receive light from the external environment or emit light to the external environment.

Please refer to FIG. 1 to FIG. 5, in the aforementioned embodiments, the numbers of the first optical hole, the second optical hole, the third optical hole, the fourth optical hole, and the fifth optical hole are provided as examples of one each, but the actual implementation is not limited thereto. The numbers of the first optical hole, the second optical hole, the third optical hole, the fourth optical hole, and the fifth optical hole can also be multiple. When the number of the first optical hole is multiple, the numbers of the second optical hole and the third optical hole are also the same as the number of the first optical hole. Taking the example of the embodiment shown in FIG. 1 as a derivative, assuming that in the structure depicted in FIG. 1, the number of the first optical hole is two, then the number of the second optical hole is also two, and the number of the third optical hole is likewise two. Each of the second optical holes corresponds one-to-one with each of the first optical holes, and each of the third optical holes also corresponds one-to-one with each of the first optical holes. Therefore, this arrangement leads to the formation of two separate channels for passage of light.

In summary, in the present invention, the first filling layer 25, 35 and the second filling layer G in the second optical hole can be produced through a single filling or multiple fillings of the filling adhesive, filling a gap between the first polarizing layer 30 and the liquid crystal display unit layer 50, or a gap between the first optical adhesive 20 and the first optical polarizing layer 30. Consequently, the present invention resolves the issues encountered in prior art, such as difficulties in controlling adhesive dispensing quantity, resulting in uneven appearance of liquid crystal display or causing gaps between the areas to be filled with optical adhesive and the optical adhesive.

What is claimed is:

1. A liquid crystal display with improved structure comprising:
   a cover plate, a first optical adhesive layer, a first polarizing layer, a liquid crystal display unit layer, a second polarizing layer, and a first filling layer; wherein the liquid crystal display unit layer is placed on the second polarizing layer; the first polarizing layer is placed on the liquid crystal display unit layer; the first optical adhesive layer is placed on the first polarizing layer; the cover plate is placed on the first optical adhesive layer; the first filling layer is placed between the first polarizing layer and the liquid crystal display unit layer.

2. The liquid crystal display with improved structure as claimed in claim 1, wherein the liquid crystal display unit layer further comprises at least one optical adhesive layer, the at least one optical adhesive is placed between cover plate and the first polarizing layer, between the first polarizing layer and the liquid crystal display unit layer, or between the first filling layer and the liquid crystal display unit layer.

3. A liquid crystal display with improved structure comprising:
   a cover plate, a first optical adhesive layer, a first polarizing layer, a first filling layer, a liquid crystal display unit layer, and a second polarizing layer; wherein the liquid crystal display unit layer is placed on the second polarizing layer; the first filling layer is placed on the liquid crystal display unit layer; the first polarizing layer is placed on the first filling layer; the first optical adhesive layer is placed on the first polarizing layer; the cover plate is placed on the first optical adhesive layer; the liquid crystal display unit layer comprises a first light-shielding layer; a first optical hole is placed on the first light-shielding layer; a second optical hole is placed on the first polarizing layer, and is provided at a position corresponding to the first optical hole; the second optical hole is filled with a second filling layer; a material of both of the first filling layer and the second filling layer is a filling adhesive.

4. The liquid crystal display with improved structure as claimed in claim 3, wherein the first polarizing layer comprises a first protective film layer, a polarizing film layer, and a second protective film layer; the polarizing film layer is placed on the second protective film layer; the first protective film layer is placed on the polarizing film layer; the second optical hole is a blind hole passing through the polarizing film layer and the second protective film layer, or a through hole passing through the first protective film layer, the polarizing film layer, and the second protective film layer.

5. The liquid crystal display with improved structure as claimed in claim 3, wherein a second optical adhesive layer is placed between the first filling layer and the liquid crystal display unit layer.

6. The liquid crystal display with improved structure as claimed in claim 5, wherein the first polarizing layer comprises a first protective film layer, a polarizing film layer, and a second protective film layer; the polarizing film layer is placed on the second protective film layer; the first protective film layer is placed on the polarizing film layer; the second optical hole is a blind hole passing through the polarizing film layer and the second protective film layer, or a through hole passing through the first protective film layer, the polarizing film layer, and the second protective film layer.

7. The liquid crystal display with improved structure as claimed in claim 3, wherein a third optical hole is placed on the first optical adhesive layer, and is provided at a position corresponding to the first optical hole; the second optical hole and the third optical hole are filled with the second filling layer, and the second optical hole is a through hole passing through the first polarizing layer.

8. The liquid crystal display with improved structure as claimed in claim 7, wherein a second optical adhesive layer is placed between the first filling layer and the liquid crystal display unit layer.

9. The liquid crystal display with improved structure as claimed in claim 3, wherein the cover plate comprises a second light-shielding layer; a fifth optical hole is placed on the second light-shielding layer, and is provided at a position corresponding to the first optical hole.

10. The liquid crystal display with improved structure as claimed in claim 3, wherein a dam is placed around a periphery of the first filling layer, and the dam is placed between the first polarizing layer and the liquid crystal display unit layer.

11. The liquid crystal display with improved structure as claimed in claim 4, wherein a dam is placed around a periphery of the first filling layer, and the dam is placed between the first polarizing layer and the liquid crystal display unit layer.

12. The liquid crystal display with improved structure as claimed in claim 7, wherein a dam is placed around a periphery of the first filling layer, and the dam is placed between the first polarizing layer and the liquid crystal display unit layer.

13. The liquid crystal display with improved structure as claimed in claim 9, wherein a dam is placed around a periphery of the first filling layer, and the dam is placed between the first polarizing layer and the liquid crystal display unit layer.

14. The liquid crystal display with improved structure as claimed in claim 5, wherein a dam is placed around a periphery of the first filling layer, and the dam is placed between the first polarizing layer and the second optical adhesive layer.

15. The liquid crystal display with improved structure as claimed in claim 6, wherein a dam is placed around a periphery of the first filling layer, and the dam is placed between the first polarizing layer and the second optical adhesive layer.

16. The liquid crystal display with improved structure as claimed in claim 8, wherein a dam is placed around a periphery of the first filling layer, and the dam is placed between the first polarizing layer and the second optical adhesive layer.

17. The liquid crystal display with improved structure as claimed in claim 9, wherein a dam is placed around a periphery of the first filling layer, and the dam is placed between the first polarizing layer and the second optical adhesive layer.

18. A liquid crystal display with improved structure comprising:
a cover plate, a first optical adhesive layer, a first filling layer, a first polarizing layer, a second optical adhesive layer, a liquid crystal display unit layer, and a second polarizing layer; wherein the liquid crystal display unit layer is placed on the second polarizing layer; the second optical adhesive layer is placed on the liquid crystal display unit layer; the first polarizing layer is placed on the second optical adhesive layer; the first filling layer is placed on the first polarizing layer; the first optical adhesive layer is placed on the first filling layer; the cover plate is placed on the first optical adhesive layer; the liquid crystal display unit layer comprises a first light-shielding layer; a first optical hole is placed on the first light-shielding layer; a second optical hole is placed on the first polarizing layer, and is provided at a position corresponding to the first optical hole; a fourth optical hole is placed on the second optical adhesive layer, and is provided at a position corresponding to the first optical hole; the second optical hole and the fourth optical hole are filled with a second filling layer; a material of both of the first filling layer and the second filling layer is a filling adhesive; wherein a dam is placed around a periphery of the first filling layer, and the dam is placed between the first optical adhesive layer and the first polarizing layer.

19. The liquid crystal display with improved structure as claimed in claim 18, wherein the cover plate comprises a second light-shielding layer, a fifth optical hole is placed on the second light-shielding layer, and is provided at a position corresponding to the first optical hole.

* * * * *